3,343,408
TRACER INJECTOR AND DETECTOR
Robert Mayer, Jr., Dallas, Tex., assignor to Well Reconnaissance, Inc., Dallas, Tex., a corporation of Texas
Filed May 13, 1963, Ser. No. 280,050
6 Claims. (Cl. 73—151)

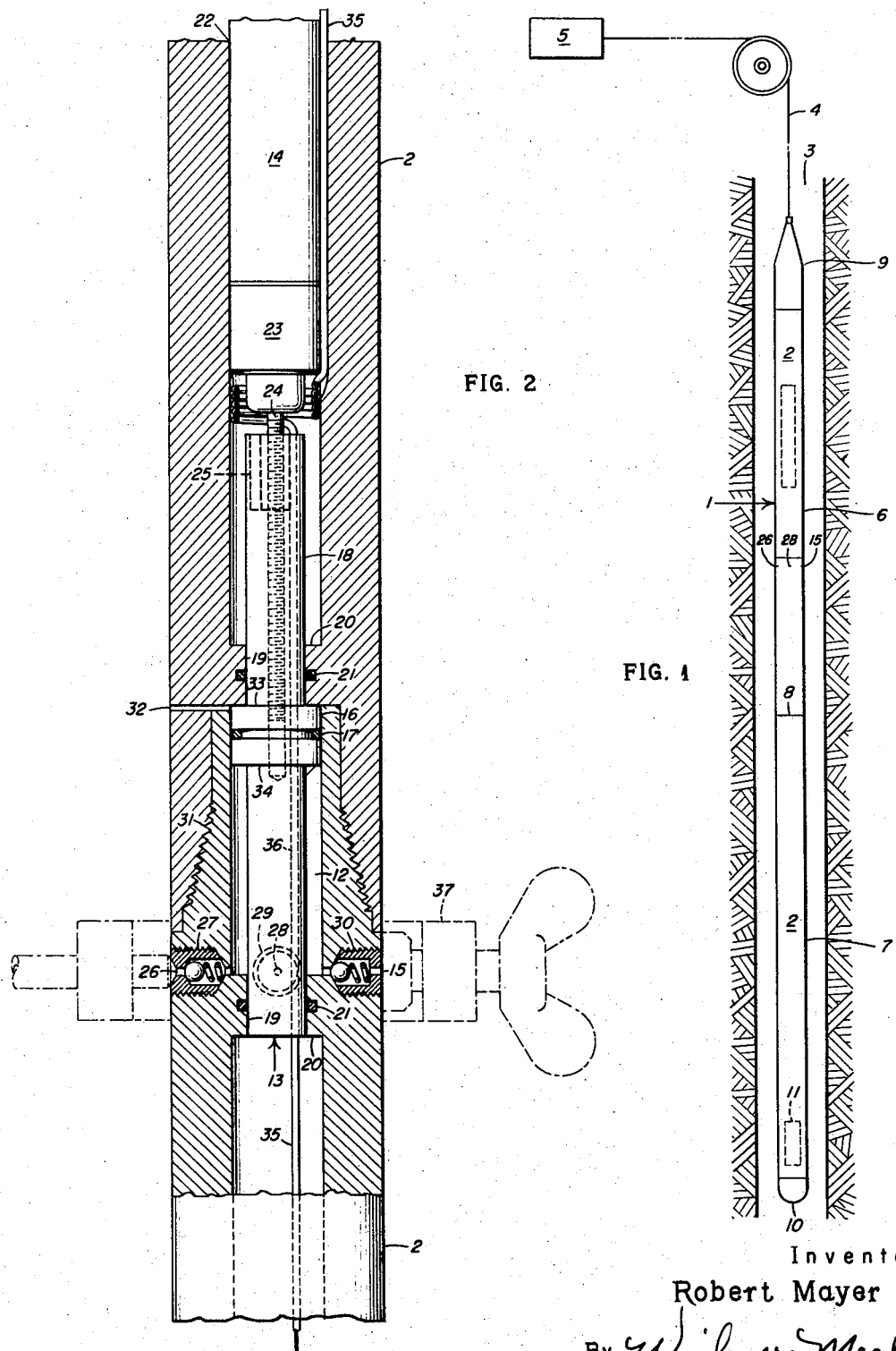

This invention relates to well surveying systems and has for its primary object the provision of an improved device insertable into a well for injecting and detecting a tracer below ground and enabling a record of conditions in the well to be obtained at ground level.

In secondary recovery of oil from wells in which the natural pressure has been substantially exhausted, it is the usual practice to recover oil remaining in the deposit tapped by the well by water flooding in which water is injected into the deposit through one or more wells offset from the oil well, forcing the oil to the surface. However, for such water flooding to be effective, it is necessary that the well or wells offset from the main or oil well, through which water is injected into the oil deposit, be substantially free of leaks and that any leaks into or out of a well indicated by the inefficiency of a particular operation be locatable so that they can be plugged. In locating such leaks, use generally is made of a radioactive tracer such as Iodine 131 to provide through a scintillometer or like sensing instrument signals at the surface from which a quantitative log or other record can be made showing the condition of the well a various levels. Until recently, the only method available in the field for obtaining a log from an injected tracer was a system which could make but one injection per run, using for the purpose a vial containing a radioactive tracer and breaking the vial to make the injection either against the bottom of the well or, for data at higher levels, by attaching an explosive cap to the vial or dropping an object down the cable upon it. More recently, more practical methods have been developed in one of which the tracer fluid is pumped from the surface to the desired level, this method, while more efficient than a vial, having the disadvantage of extreme dilution of the tracer and correspondingly difficult detection of its presence at points at any considerable distance below the surface. To avoid the extreme dilution and consequent difficulty of detection of the tracer attendant surface injection, injectors have been developed which are capable of making several subsurface injections in a run under control from the surface. However, such injectors use fixed charges of the tracer and, unless the charges are ejected explosively, are incapable of operating at pressures in excess of around 1,000 p.s.i. Too, the fixing of the quantity of each charge not only limits the number of possible injections to that of the individual charges provided in the injector but renders it difficult, even by varying the number of charges ejected simultaneously to adapt the injections to varying conditions, such as differences in the flow rate of water in the well.

An object of this invention is to provide a tracer injector which not only is capable of making a plurality of subsurface injections of a tracer under control from the surface but under the same control can regulate as desired the quantity ejected in each injection.

Another object of the invention is to provide a tracer injector which is both capable of making subsurface injections, each of any desired quantity, and independent in its operation of the pressure to which it is exposed.

An additional object of the present is to provide a tracer injector wherein the supply of tracer is contained in a chamber and ejectable therefrom under control from the surface by a positive displacement pump, thereby enabling the quantity of tracer ejected at any injection to be varied at will.

A further object of the invention is to provide a tracer injector wherein the tracer is ejected in desired quantities from a chamber by a driven piston controllable from the surface and so exposed to ambient pressure as to neutralize the effect of that pressure upon its operation.

Another object of the invention is to provide a combined tracer injector and detector wherein the injector is of the character above described and it and the detector can readily be interchanged in their relative positions for detecting leakage either into or out of a well.

Other objects and advantages of the invention will appear hereinafter in the detailed description, be particularly pointed out in the appended claims and be illustrated in the accompanying drawings, in which:

FIGURE 1 is a somewhat schematic view of a well surveying system embodying the improved tracer injector and detector of the present invention; and FIGURE 2 is a fragmentary vertical sectional view on an enlarged scale showing the internal construction of a preferred embodiment of the improved tracer injector.

Referring now in detail to the drawings in which like reference characters designate like parts, the improved tracer injector and detector of the present invention, while probably finding its main use in injecting and detecting radioactive tracers, is also usable for injecting and detecting other fluids, such as a heated fluid for detection by a temperature-sensitive detector or a dye for detection by a photo-electric cell.

Whatever the nature of the tracer, the improved tracer injector and detector or injecting and detecting device, probe or instrument assembly, designated as 1, is comprised of a plural-section container, housing, case or shell 2 which is adapted to be run or reeled up and down a well 3 on a supporting cable. 4. In the cable 4 are contained electric leads for controlling injections of the tracer from the surface and also for transmitting signals derived from the tracer to the surface where they ordinarily will be amplified and recorded by a suitable recorder or logger 5. The main elements of the device or assembly 1 are a tracer injector or injector section or instrument 6 and a detector or sensing section or instrument 7 which are joined together in superposed or axially aligned relation, preferably by a threaded and sealed joint 8. In the illustrated embodiment the other elements of the device are an attachment head 9 supported directly on the cable 4 and a cap 10 closing the lower end of the device and the several sections are provided with screw joints such that the relative positions of the tracer and detector sections 6 and 7 can readily be reversed. The detector section 7 contains within its part of the container 2 a detector or sensing unit 11 suitable for quantitatively signaling the presence of the particular tracer used and which in the expected main use will be a gamma ray or scintillation detector for signaling the concentration of a radioactive tracer, such as Iodine 131, present in the water or other ambient or surrounding medium at the particular level in the well. As in the illustrated embodiment, the sensing unit 11, to sense a radioactive tracer, will usually be positioned in the end portion of its section removed from the tracer section and the spacing provided by the length of the device between the detecting unit and the tracer stored in the ejector section is sufficient to prevent sensing of the tracer except in the medium surrounding the sensing unit.

The tracer injector 6 has, as its basic components within its part or section of the container 2, a chamber or reservoir 12 of a capacity to contain a sufficient quantity of a tracer fluid or liquid to make a plurality of injections and a positive displacement pump 13 controllable from the surface for regulating or controlling as desired the quantity or amount of tracer ejected from the chamber in a given injection. In the illusrtated embodiment, the chamber or reservoir 12 is a cylindrical bore in the tracer section of the container 2 and the positive displacement pump 13 is a piston drivable by an electric motor 14 against the tracer fluid in the chamber for ejecting the fluid from the chamber through an ejection port 15. The preferred piston 13 has a head 16 slidable or reciprocable in the bore 12 and sealingly engaging or sealed against the bore, as by an O-ring 17 carried by and encircling the head 16. The piston 13 also preferably has a cylindrical stem 18 interrupted intermediate its ends by the head 16 and projecting on either side or above and below the head through correspondingly configured apertures 19 in the upper and lower end walls 20 of the chamber 12, with the sliding joints between the stem and the walls about the apertures suitably sealed, as by O-rings 21, for preventing entry of fluid into the container 2 beyond the chamber 12.

The stem 18 of the piston 13 is of sufficient length to ride or slide in the apertures 19 over or throughout the range of movement of the head 16 within the chamber 12 and the motor 14 for driving the piston is contained in a cavity 22 in the container 2 above or beyond the upper or adjoining wall 20 of the chamber and drives the piston through reduction gearing 23 and a drive shaft 24 which is concentric with and threaded into the piston. For nicety or exactness of control of the quantity of tracer ejected in each injection, the reduction gearing 23 preferably is such as to give the drive shaft 24 a speed on the order of 25 r.p.m., with friction and the transmission of torque between the shaft and the piston preferably minimized by drivably connecting the shaft to the piston by a ball bearing or like anti-friction drive indicated at 25 within the adjoining end of the piston.

For loading the tracer chamber 12, the latter is provided with one or, as illustrated, two inlet ports, one a pressure inlet port 26 normally closed by a check valve 27 openable to permit introduction of fluid and the other a non-pressure inlet port 28 normally closed by a threaded plug 29. The outlet or ejection port 15 also preferably is normally closed by a check valve 30 openable under pressure somewhat higher than the inlet check valve 27 to permit tracer fluid to be ejected under force of the piston 13 but prevent its ejection while the chamber is being loaded. The radial inlet or feed and outlet or ejector ports 26, 28 and 15 open onto the lower end of the chamber 12 and, to permit installation and removal of the piston, there is provided in the container 2 within the vertical or axial limits of the chamber a threaded joint 31 which, to eliminate the need for a seal, opens onto the chamber above the uppermost position of the O-ring 17 on the head 16.

An important feature of the injector is its provision for neutralizing or counterbalancing the effect of the ambient or outside pressure on the piston 13 so that that pressure will not affect the force required to be exerted by the motor 14 in moving the piston. The neutralizing or balancing of the effect of the ambient or surrounding or outside pressure on the piston is the function of a bleed port 32 extending radially through the container 2 into the upper end portion of the chamber 12 above the uppermost position of the O-ring 17 on the head 16. Unlike the inlet and ejector ports 26, 28 and 15, the bleed port 32 is constantly open and thus at all times maintains ambient or outside pressure on the upper end or side 32 of the head 16.

In the operation of the device 1, the chamber 12, between its lower end wall 20 and the underside or under end 34 of the head 16, will always be filled with tracer fluid to the limit of the downward movement or advance stroke of the piston 13 and that fluid will automatically assume ambient pressure. Thus, the effect of the bleed port 32 is to maintain both sides of the piston head 16 at ambient pressure. With the effect of ambient pressure on the piston 13 so neutralized, the injector is independent of and not affected by that pressure and the only force required to be exerted by the motor 14 on the piston at any level in a well is the force required to open the check valve 30 in the ejection port and to overcome the friction of the O-rings 17 and 21.

The principle upon which the device 1 operates is that by injecting a given quantity of a tracer fluid into a well at one point and sensing the quantity or concentration, if any, of the tracer in the water or other surrounding medium at a different point, a variation in the concentration at the latter point from that obtainable from the presumed rate of flow of the medium will indicate leakage and by progressively narrowing the distance between the points of ejection and sensing, the leak can be located exactly. If the leakage is into the well the flow of the water will be upward and in that case the device 1 will be assembled with the sensing section 7 above the injector section 6. However, more usually, the leakage will be of water from the well that was injected at the surface, in which case the flow will be downward, requiring the sensing section to be disposed below the ejecting section, as in the illustrated embodiment. In the latter assembly, signaling wire 35 from the sensing unit 11 must be led through the injector section 6. This is provided for in the illustrated device by a drilling 36 extending eccentrically through the piston 13 through which the signaling wire can be led.

If, as is preferred, the motor 14 is a reversible constant-speed motor, the rate of advance of the piston 13 and the free cross-section of the chamber 12 are both known factors. It therefore is possible by controlling the time interval during which the motor is operated in a particular injection to regulate, control or determine exactly the quantity or increment of the tracer ejected in a given injection. Also the total of prior intervals of operation of the motor 14 in any run provides a ready measurement at any time in the run of the volume of tracer remaining in the chamber and available for further injections. Ordinarily the motor will be reversed only when the chamber 12 is being loaded and, to prevent entrapment of air in the chamber at that time, it is preferred that the loading be coincident with the upward movement or retract stroke of the piston under reverse drive by the motor. If, as in the illustrated embodiment, the pressure inlet port 26 itself is not fitted for connection of a feed line, any difficulty on this score can readily be avoided by use of a clamp, such as indicated at 37, for holding the feed line tight against the inlet port during loading.

As mentioned earlier, the main purpose of the bleed port 32 is to neutralize the effect of pressure upon the operation of the piston 13. However, if desired, this port can also be made use of for sampling the medium in the well, since that medium will be introduced through the bleed port into chamber 12 above the upper end 33 of the head 16 as the piston advances and will be carried in that part of the chamber to the surface when the device 1 is withdrawn from the well.

From the above detailed description, it will be apparent that there has been provided an improved tracer injector and detector by which any desired quantity of tracer fluid can be injected into a well at any level under control from the surface and which is unaffected in its operation by ambient pressure. It should be understood that the described and disclosed embodiment is merely exemplary of the invention and that all modifications are intended to be included that do not depart from the spirit of the invention or the scope of the appended claims.

Having described my invention, I claim:

1. A device for determining conditions in a well comprising a container supportable by a cable within said well, a cylindrical chamber in said container for storing a fluid tracer, a piston slidable in and sealingly engaging a side wall of said chamber for ejecting substantially all of said tracer therefrom, motor means in said container and controllable from the surface for intermittently driving said piston at a predetermined rate in said chamber and thereby determining the exact quantity of said tracer ejected from said chamber in any ejection, and sensing means in said container for sensing the tracer so injected.

2. A device for determining conditions in a well comprising a container supportable by a cable within said well, said container including injector and detector sections axially connectable and reversible in relative axial positions, a cylindrical chamber in said injector section for storing a quantity of a liquid tracer sufficient for a plurality of injections, a piston slidable in and sealingly engaging a side wall of said chamber for ejecting substantially all of said tracer therefrom, motor means in said injector section and controllable from the surface for intermittently driving said piston at a predetermined rate in said chamber and thereby determining the exact quantity of tracer ejected from said chamber in any of a plurality of injections, and sensing means in said sensing section for sensing the tracer injected at a given injection.

3. In a well surveying system, a tracer injector comprising a container supportable on a cable in a well, a cylindrical chamber in said container for storing a quantity of a liquid tracer sufficient for a plurality of injections, a piston slidable in and sealingly engaging a side wall of said chamber for ejecting substantially all of said tracer therefrom into said well, and motor means in said container and controllable from the surface for intermittently driving said piston at a constant rate in said chamber and thereby determining the exact quantity of tracer ejected from said chamber in a given injection.

4. In a well surveying system, a tracer injector comprising a container supportable on a cable in a well, a cylindrical chamber in said container for storing a quantity of a liquid tracer sufficient for a plurality of injections, a piston slidable in and sealing engaging a side wall of said chamber for ejecting substantially all of said tracer therefrom into said well, a motor in said container outside said chamber and controllable from the surface for intermittently driving said piston at a predetermined rate in said chamber and thereby determining the exact quantity of said tracer ejected from said chamber in a given injection, and means in said container for neutralizing the effect of ambient pressure upon the drive of said piston.

5. In a well surveying system, a tracer injector comprising a container supportable on a cable in a well, a cylindrical chamber in said container for storing a quantity of a liquid tracer sufficient for a plurality of injections, a normally closed ejector port opening from one end of said chamber, a piston having a head reciprocable in and sealingly engaging a side wall of said chamber for ejecting substantially all of said tracer therefrom through said ejector port, a reversible constant-speed motor in said container outside said chamber and drivably connected to said piston, said motor being controllable from the surface for intermittently driving said piston at a constant rate in said chamber and thereby determining the exact quantity of said tracer ejected from said chamber in a given injection, said piston having a stem of uniform cross section extending from opposite sides of said head and at all times projecting through opposite ends of said chamber, and an open bleed port opening onto an opposite end of said chamber for admitting ambient fluid thereinto between said end and said head and thereby neutralizing the effect of said pressure upon drive of said piston.

6. In a well surveying system, a tracer injector comprising a container supportable on a cable in a well, a cylindrical chamber in said container for storing a quantity of a liquid tracer sufficient for a plurality of injections, a normally closed ejector port opening from one end of said chamber, a piston having a head reciprocable in said chamber for ejecting substantially all of said tracer therefrom through said ejector port, sealing means on said head and sealingly engaging a side wall of said chamber, a joint in said container and terminating inwardly at an opposite end of said chamber and sealed by said sealing means from tracer in said chamber, a stem of uniform cross section on said piston and extending from opposite sides of said head at all times through opposite ends of said chamber, a reversible constant-speed motor in said container outside said chamber and drivably connected to said piston, said motor being controllable from the surface for intermittently driving said piston at a constant rate in said chamber and thereby determining the exact quantity of said tracer ejected from said chamber in a given injection, an open bleed port opening onto an opposite end of said chamber for admitting ambient fluid thereinto between said end and said head and thereby neutralizing the effect of said pressure upon drive of said piston, and normally closed inlet port means opening onto said first-named end of said chamber for loading tracer thereinto.

References Cited
UNITED STATES PATENTS

| | | | |
|---|---|---|---|
| 1,428,300 | 9/1922 | Scharpenberg | 103—46 |
| 2,599,975 | 6/1952 | Carpenter. | |
| 2,679,182 | 5/1954 | Proctor et al. | 73—155 X |
| 2,681,567 | 6/1954 | Widess | 73—151 |
| 3,156,818 | 10/1964 | Cladwell | 73—155 X |

JAMES J. GILL, *Acting Primary Examiner.*

JOHN P. BEAUCHAMP, *Examiner.*